Mar. 27, 1923.

A. J. YEAGER.
FOLDING OVEN.
FILED APR. 5, 1922.

Anton J. Yeager
INVENTOR.

BY
Mason, Fenwick & Lawrence
ATTORNEYS.

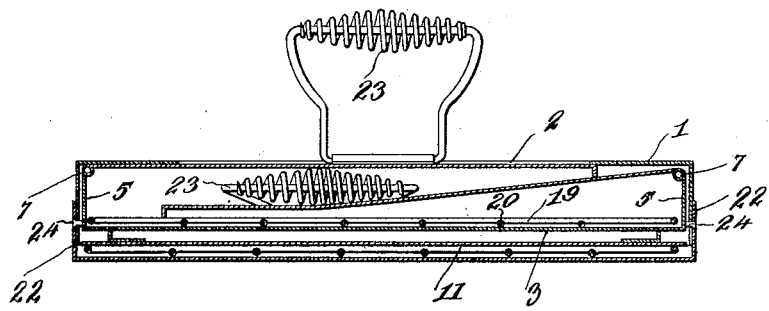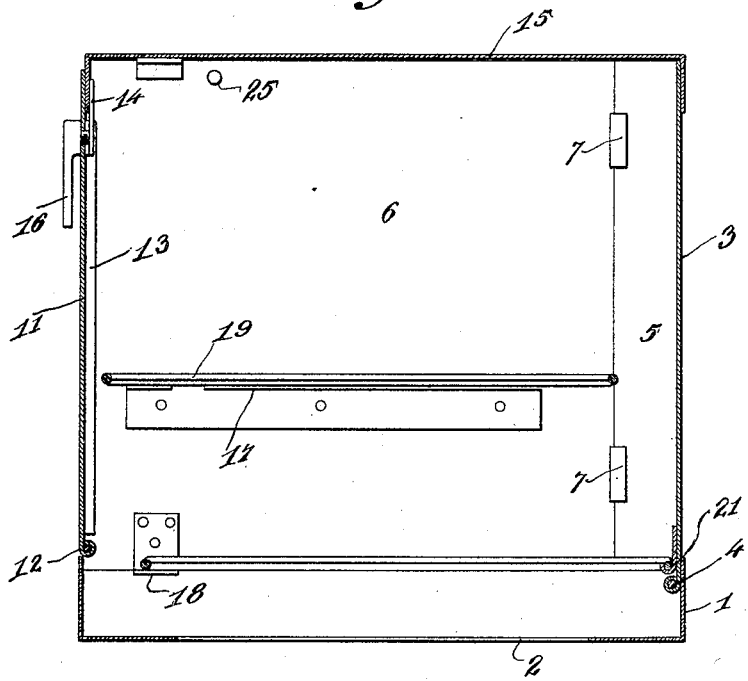

Patented Mar. 27, 1923.

1,450,056

UNITED STATES PATENT OFFICE.

ANTON J. YEAGER, OF WISCONSIN RAPIDS, WISCONSIN, ASSIGNOR TO PRENTISS-WABERS STOVE COMPANY, OF WISCONSIN RAPIDS, WISCONSIN.

FOLDING OVEN.

Application filed April 5, 1922. Serial No. 549,932.

*To all whom it may concern:*

Be it known that I, ANTON J. YEAGER, a citizen of the United States, residing at Wisconsin Rapids, in the county of Wood and State of Wisconsin, have invented certain new and useful Improvements in Folding Ovens; and I do hereby declare the following to be a full, clear, and exact description of the invention, such as will enable others skilled in the art to which it appertains to make and use the same.

This invention relates to new and useful improvements in ovens, and more particularly to a portable type of oven, the main object of the present invention being the provision of a portable oven, which can be quickly and readily folded into compact form so as to occupy minimum space during shipment or when not in use as a cooking article.

Another object of the present invention is the provision of a portable oven for cooking purposes which can be used in connection with a gas or a coal range and wherein the side and end portions may be readily folded into the bottom portion of the oven to be arranged in compact form when not in use, and wherein one of the handle members which is utilized for moving the oven from place to place will be disposed through the bottom opening of the oven so that the device, when in its compact form may be readily conveyed from place to place.

A still further object of the invention is the provision of a portable oven of the above character comprising a bottom portion having an opening whereby the heat from the burner over which the oven is placed may be readily conveyed to the interior of the oven and provided at its end portions with suitable handles and the side and end portions being adapted to be folded inwardly into the bottom of the oven and so folded that one of the handle portions will project through the opening in the bottom whereby to provide means for conveying the oven in a folded condition from place to place.

With the above and other objects in view the invention consists in the novel features of construction, combination and arrangement of parts hereinafter more fully set forth, pointed out in the claims and shown in the accompanying drawings, in which:

Fig. 3 is a longitudinal sectional view taken through the device when folded, and Fig. 4 is a similar view taken through the oven when set up ready for use.

Figure 1:
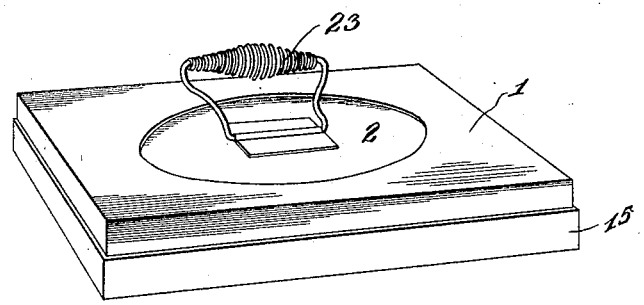
Figure 1 is a perspective view of portable oven constructed in accordance with my invention showing the same in its folded position.

In carrying out the invention, I first provide a bottom member which is substantially rectangular in form as illustrated in the accompanying drawings, but it will be apparent should it be desired to make the device of different sizes, the bottom portion may be formed other than rectangular. The bottom which is generally indicated by the numeral 1, comprises side and end walls and having an enlarged opening 2 whereby the heat from any type of burner may be permitted to pass upwardly into the body portion of the oven.

The various side and end portions of the body are hingedly connected together and movably mounted with respect to the bottom portion 1 so that they may be quickly and readily folded together to compact form and thence folded into the bottom 1 as illustrated in Fig. 3.

The back portion of my improved oven which is generally indicated by the numeral 3 is hingedly connected to the rear side wall of the bottom portion 1 as shown at 4 and is adapted to be folded inwardly into the bottom member when not in use. The back portion 3 is provided at each end with the inwardly projecting flanges 5 to which are hinged the end portions 6 by means of the hinges 7. From this it will be apparent that in folding the device, the end portions 6 are folded inwardly onto the back member 3 before the back member is folded into the bottom of the oven.

Figure 2:
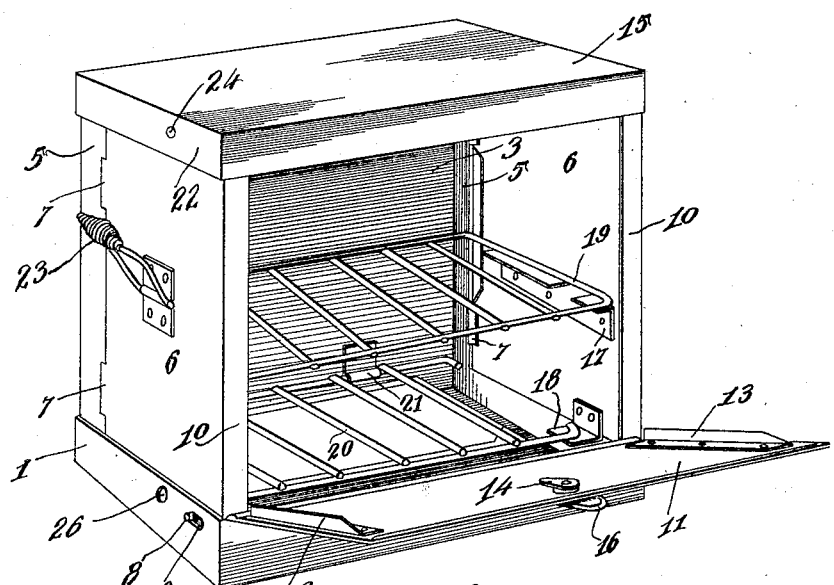
Fig. 2 is a perspective view of the oven set up ready for use.

When the back portion 3 and the side portions 6 are set up as illustrated in Figs. 2 and 4, they are retained in their respective positions by having the pins 8 which are carried by the end portions 6 arranged within the slots 9 formed in the end walls of the bottom member 1. The end portions 6 are also provided with inwardly projecting flanges 10 which are arranged at their lower ends on the inside of the front wall of the bottom member 1 as shown in Fig. 2 so as to retain the pins 8 in their respective slots 9 and thus support the ends 6 and the back portion 3 in an upright position.

The front wall which is in the form of a door 11 is hingedly connected to the front wall portion of the bottom member 1 as at 12 and is adapted to swing upwardly to close the front portion of the oven when in an upright position as shown in Fig. 4. It will be noted that suitable angle strips 13 are connected to the inner face of the door 11, the outwardly projecting flange of each angle piece forming a guide or stop flange adapted to be engaged by the inner edges of the flanges 10, whereby to prevent lateral movement of the door 11 when in a closed position as shown in Fig. 4.

In order to retain the door 11 in its closed position, a pivoted button 14 is arranged upon the inner side of the door as shown in Fig. 2, and is adapted to engage with the forward flange of the top portion 15 as shown in Fig. 4, said button being operated through the medium of a handle 16 arranged upon the exterior of the door so that the button 14 may be readily engaged and disengaged with the flange of the top 15 by manipulating the handle 16.

The end portions 6 are provided upon the exterior thereof with spaced shelf portions 17 and 18, the upper shelves 17 being adapted to support a removable grate 19 while the shelf portions 18 are adapted to support the outer edge of a grate 20, the inner edge of said grate being hingedly connected to the back portion 3, by means of the hinges 21.

When the device is set up ready for use, as shown in Fig. 2, the back portion and the end portions 6 are arranged in an upright position, the pins 8 being disposed within the slots 9 to retain the portions in their upright positions. The grate 20 is folded outwardly so that the free edge thereof rests upon the shelves 18 and the grate 19 can then be placed in position upon the shelves 17. The cover 15 is then engaged over the upper edges of the back 3 and the end portions 6, the overhanging flange 22 of the cover section extending downwardly over the upper edges of the back 3 and the end portions 6.

In order that the oven, when in use, can be readily arranged over a heating element, suitable handle members 23 are connected with the outer sides of each of the end portions 6 so that the oven, when in an operative position as shown in Fig. 2, can be readily moved about. The cover 15 is retained in position upon the upper edges of the back and side portions by means of the pins 24 which are carried by the cover and adapted to engage within the openings 25 formed in the upper edges of the side portions 6.

When it is desired to fold the oven into compact form as illustrated in Figs. 1 and 3, the cover 15 is removed by pressing inwardly upon the upper edges of the end portions so as to disengage the pins 24 from the openings 25, the cover is then removed and the grate 19 removed from the body of the oven. The grate 20 is then swung upwardly against the back portion 3, the end portions 6 are then alternately folded onto the back portion 3 and the back portion swung inwardly into the bottom 1, the door 11 which constitutes one side wall of the oven, is then swung inwardly onto the back portion, the grate 19 which has been previously removed from the body of the oven is then placed upon the top of the door 11 so that all parts of the oven are arranged within the bottom member 1. After the parts have been folded into the bottom member 1, the cover member 15 is then arranged over the upper edges of the wall portions of the bottom, the pins 24 being engaged with suitable openings 26 formed in the end walls of the body at a point adjacent the slots 9. From this it will be apparent that all parts of the oven are folded into compact form so as to occupy minimum space when not in use.

Attention is called to the particular folding movement so that one of the handle members 23 extends through the opening 2 in the bottom 1 and can be utilized for conveying the folded oven from place to place.

From the above description, taken in connection with the accompanying drawings, it will be readily apparent that I have provided an oven of the type set forth which can be inexpensively manufactured, and one which can be quickly and readily set up ready for use or set up in compact form when not in use so as to occupy a minimum space and wherein the device may be manufactured of various sizes and while I have shown and described the present oven constructed with only one opening, as shown at 2, it will be apparent that should it be found desirable to make the ovens larger, more than one hole in the bottom can be used in accordance with the type of heating element upon which the oven is mounted.

I claim:

1. An oven comprising a bottom having side and end walls, a body comprising side and end walls hingedly connected to the bottom and adapted to be folded into the bottom portion and a removable cover engaging the side and end walls of the body when in an upright position and adapted to engage over the side and end walls of the bottom portion when the side and end walls of the body are folded into the bottom portion and a handle on one of said walls adapted to extend through an opening in the bottom portion when said walls are in folded position.

2. A device of the class described including a bottom portion having side and end walls, a body comprising foldable sections adapted to fold into the bottom portion and a removable cover adapted to engage the foldable sections when in an upright position and to engage the side and end walls of the bottom when the foldable sections are arranged within the bottom portion and a handle on one of said walls adapted to extend through an opening in the bottom portion when said walls are in folded position.

3. A device of the class described including a bottom portion having side and end walls and provided with an opening, a body portion comprising foldable sections adapted to fold into the bottom portion, certain of said sections having handle members and said sections being folded whereby one of the handle members will extend through the opening in the bottom when the device is folded and a removable cover for the sections when in an upright position and adapted to engage the side and end walls of the bottom when in a folded position.

4. A device of the class described including a bottom portion having side and end walls and an opening through the bottom, a body comprising foldable sections, handle members carried by certain of said sections, said sections being folded into the bottom portion whereby one of the handles will project through the opening as and for the purpose set forth.

5. An oven of the character described comprising a bottom portion having side and end walls, a body comprising foldable sections, means for retaining said sections in an upright position, said sections being adapted to be folded into the bottom portion, a removable cover for engagement over the foldable sections when in an upright position and said cover being adapted to engage the side and end walls of the bottom when the device is in a folded position and a handle on one of said walls adapted to extend through an opening in the bottom portion when said walls are in folded position.

In testimony whereof I affix my signature.

ANTON J. YEAGER.